United States Patent
Khadiyev et al.

(10) Patent No.: US 10,535,182 B2
(45) Date of Patent: Jan. 14, 2020

(54) METHOD OF RENDERING COMPUTER GRAPHICS CURVES

(71) Applicant: Ephere Inc., Markham (CA)

(72) Inventors: Marsel Khadiyev, Markham (CA); Nikolay Shtinkov, Ottawa (CA)

(*) Notice: Subject to any disclaimer, the term of this patent is extended or adjusted under 35 U.S.C. 154(b) by 21 days.

(21) Appl. No.: 15/903,621

(22) Filed: Feb. 23, 2018

(65) Prior Publication Data
US 2019/0266781 A1 Aug. 29, 2019

(51) Int. Cl.
*G06T 15/06* (2011.01)
*G06T 11/20* (2006.01)
*G06T 15/10* (2011.01)

(52) U.S. Cl.
CPC .......... *G06T 15/06* (2013.01); *G06T 11/203* (2013.01); *G06T 15/10* (2013.01)

(58) Field of Classification Search
None
See application file for complete search history.

(56) References Cited

U.S. PATENT DOCUMENTS

2013/0231768 A1* 9/2013 Jensen .............. G05B 19/18
700/98

OTHER PUBLICATIONS

Exact Arrangements on Tori and Dupin Cyclides, pp. 59-66, ACM, Jun. 2008.*

Langevin et al. "Gluing Dupin cyclides along circles, finding a cyclide given three contact conditions", retrieved from https://hal-univ-bourgogne.archives-ouvertes.fr/hal-00785322/document/; Feb. 2013.
"HairFarm Modifier | VRayHairFarmMod", retrieved from https://docs.chaosgroup.com/display/VRAY3MAX/HairFarm+Modifier+%7C+VRayHairFarmMod; as early as Mar. 2016.
"Curves—Arnold for Maya User Guide 4—Solid Angle", retrieved from https://support.solidangle.com/display/AFMUG/Curves; as early as Mar. 2015.
Woop et al. "Exploiting Local Orientation Similarity for Efficient Ray Traversal of Hair and Fur", HPG '14 Proceedings of High Performance Graphics, Jun. 2014.
"Not-so-basic ray tracer, stage 7", retrieved from http://renderspud.blogspot.ca/2011/05/thin-primitive-rendering-curves.html; May 2011.
Nakamaru et al. "Ray Tracing for Curves Primitive", WSCG ' 2002. The 10-th International Conference in Central Europe on. Computer Graphics, Mar. 2002.
"Curves—RenderMan 21—Renderman Documentation", retrieved from https://rmanwiki.pixar.com/display/REN/Curves; accessed 2018.
Afra et al. "Embree Ray Tracing Kernels: Overview and New Features"; Intel Corporation; 2016.
Channel surface—Wikipedia, https://en.wikipedia.org/wiki/Channel_surface; as early as Jul. 2013.
"Basic Concepts", retrieved from https://pages.mtu.edu/~shene/COURSES/cs3621/NOTES/surface/basic.htm; accessed 2018.

(Continued)

*Primary Examiner* — Frank S Chen
(74) *Attorney, Agent, or Firm* — Stanzione & Associates, PLLC; Patrick Stanzione

(57) ABSTRACT

A system, devices and methods to reduce the volume of data required to represent three-dimensional smooth cylindrical curves and to ray-trace these three-dimensional smooth cylindrical curves using a set of geometric primitives which have implicit curvature.

18 Claims, 12 Drawing Sheets

(56) References Cited

OTHER PUBLICATIONS

"Using Splines to Create Objects", retrieved from http://www.oocities.org/siliconvalley/lakes/1434/spline/tutorial2.html; accessed 2018.
"Approximate a curve with a limited number of line segments and arcs of circles", retrieved from https://stackoverflow.com/questions/42995738/approximate-a-curve-with-a-limited-number-of-line-segments-and-arcs-of-circles; accessed 2018.
Maier et al. "Minimum Description Length Arc Spline Approximation of Digital Curves", 19th IEEE International Conference on Image Processing; Sep. 2012.
Foufou et al. "Dupin Cyclide Blends Between Quadric Surfaces for Shape Modeling", Eurographics 2004, vol. 23, No. 3, 2004.
Bizzarri et al. "A symbolic-numerical method for computing approximate parameterizations of canal surfaces", Computer-Aided Design 44, 846-857, Apr. 2012.

\* cited by examiner

FIG. 5A
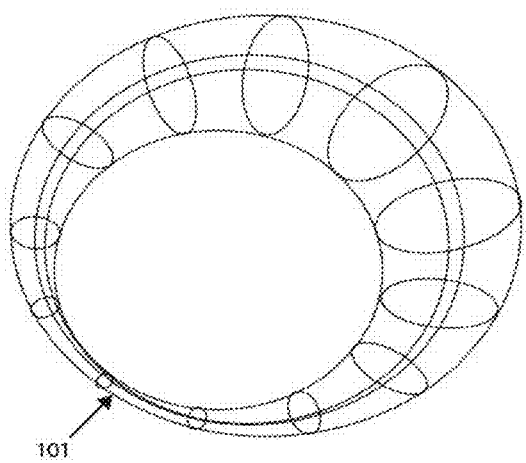
FIG. 5B
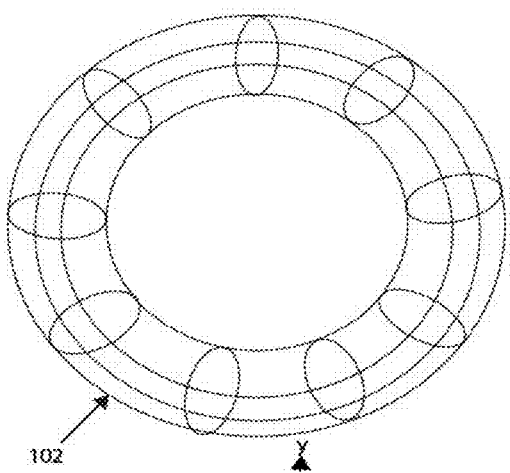
FIG. 5C
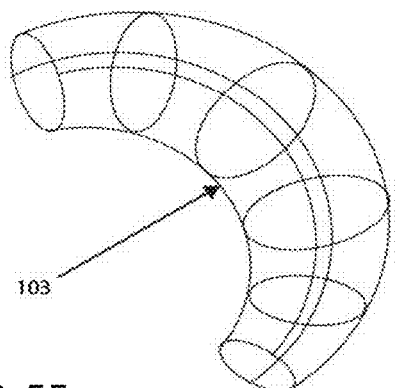
FIG. 5D
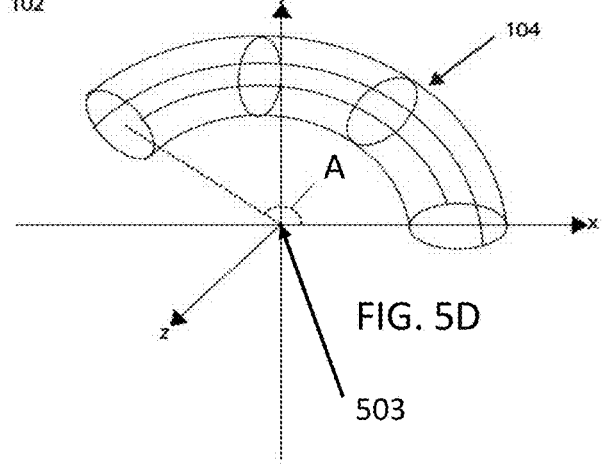
FIG. 5E
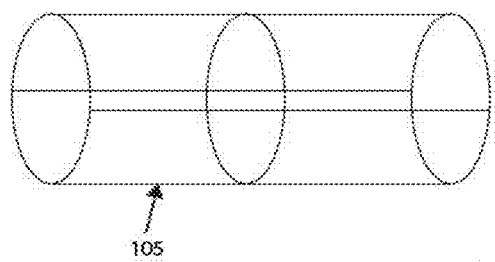
FIG. 5F
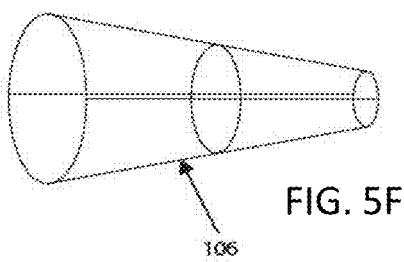
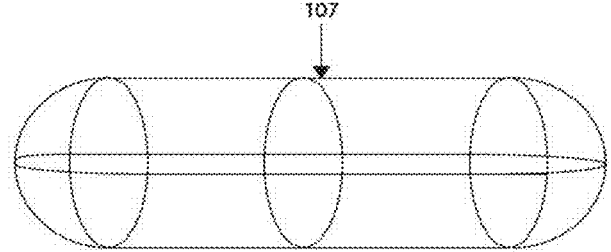
FIG. 5G

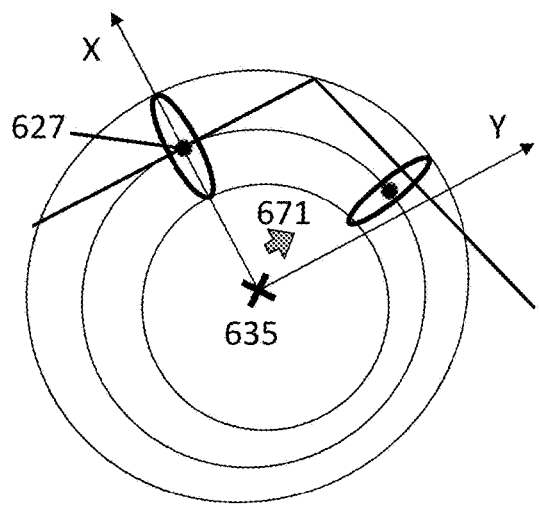
FIG. 6D(1)
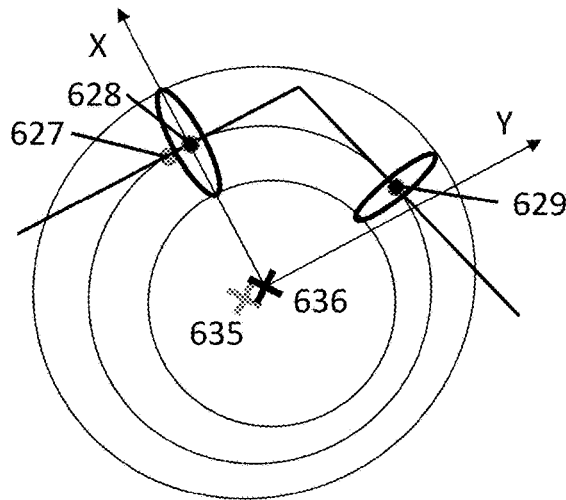
FIG. 6D(2)
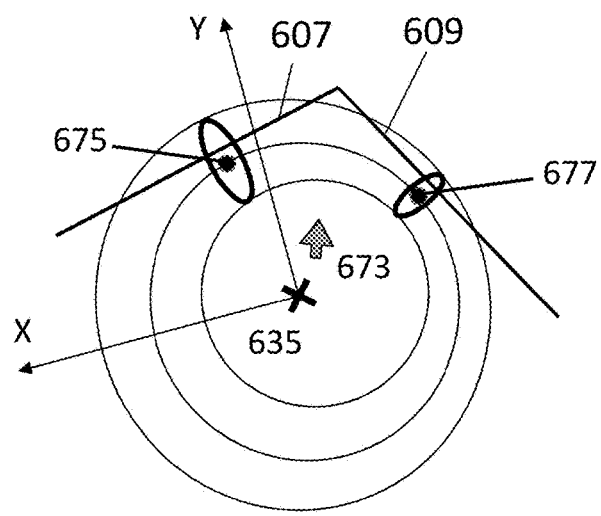
FIG. 6D(3)

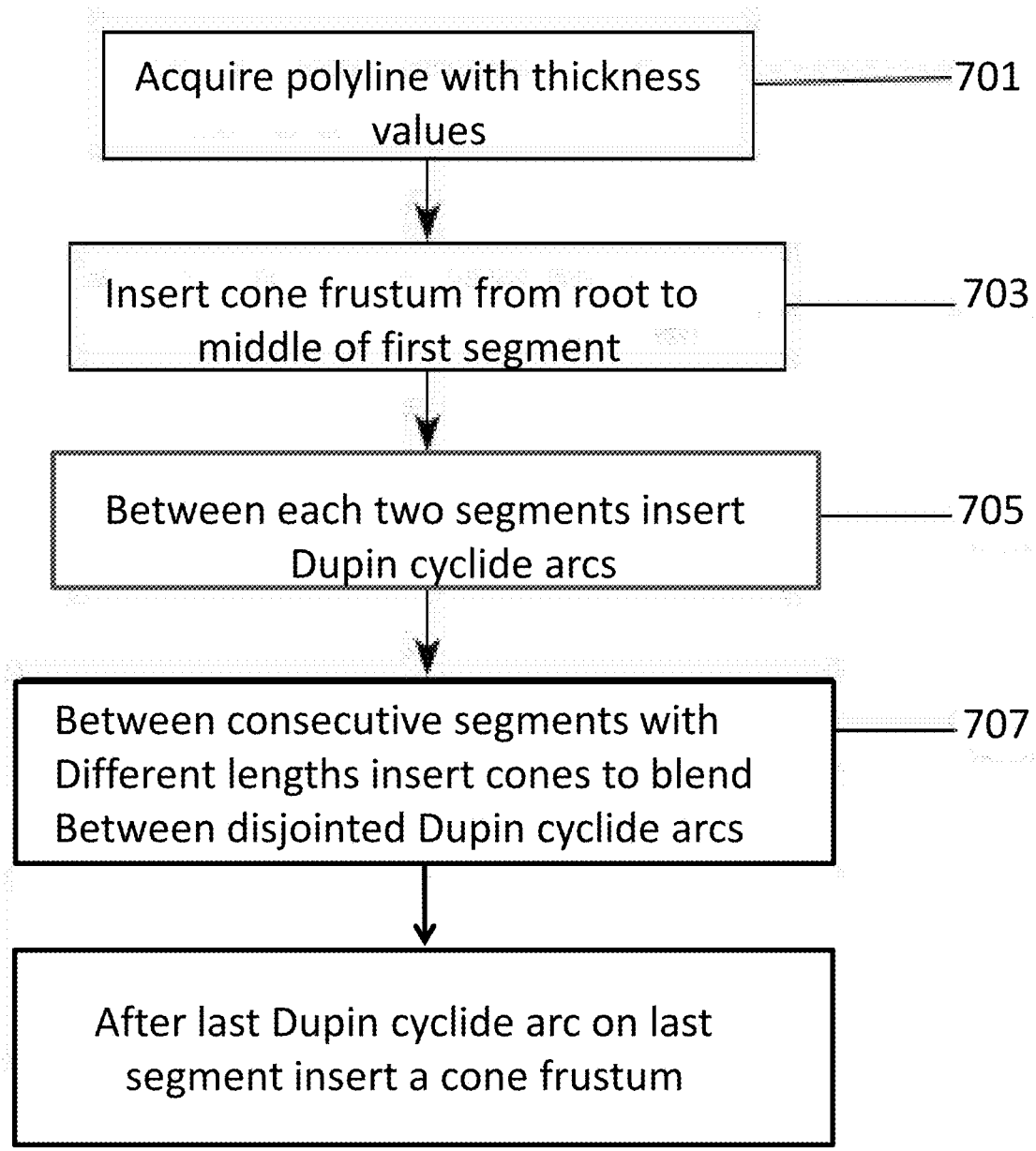

METHOD OF RENDERING COMPUTER GRAPHICS CURVES

BACKGROUND OF THE INVENTION

Currently methods for rendering curves in computer graphics rely on sampling curves into linear segments and then ray-tracing these segments using basic shapes, such as capsules. In this case curves in various representations are accepted and tessellated before rendering, for example using V-ray dynamic curve tessellation and Arnold Render curve sampling.

Recent improvements in optimization libraries, such as "Embree," are mainly designed for rendering hair. Embree organizes and packs millions of linear segments generated this way for efficient hair strand ray tracing.

Most software which models hair and other thin cylindrical fibers relies on using curves represented as a set of linear segments called polylines. These polylines are either directly passed to the ray-tracer or first converted into a parametric curve representation such as a non-uniform rational basis spline (NURBS) or B-splines and then re-interpolated back into linear segments, which ray-tracers accept. This approach requires large RAM memory to store enough capsule geometries to smoothly represent incoming curves.

Other approaches for ray-tracing curves of hair strands do not require tessellating curves. Instead these other approaches attempt to directly ray-trace curved surfaces by using Newton-based iterative solvers, such as NURBS curve thin primitives rendering and optimizations such as projecting the curve onto a camera-facing plane and calculating distance to a simplified 2d curve, such as "Ray-tracing for curves primitive". A "Renderman" renderer supports rendering of NURBS and Bezier splines and "Embree" has an option for rendering swept Bezier curves. However, these solutions are slow due to their iterative solving method and additional processing steps.

Working with implicit surfaces is a well-known problem in the field of computer aided design (CAD). CAD aims to solve a problem of representing arbitrary shapes by using a set of formulas describing multiple adjoined surfaces. Canal surfaces are used to represent curves which follow a path Directrix and have a radius function r(t) to represent thickness along the curve length.

Dupin cyclides and tori are quartic surfaces often used to blend between other implicit surfaces to define arbitrary parametric shapes, including canal surfaces.

Torus arcs have also been used as components of a bigger ray-traced curve in ray-tracers such as "POV-Ray".

However, conventional torus arcs do not allow for variance in radii between its ends, and thus curves are forced to have a constant thickness.

Algorithms exist for converting polylines into a set of line segments and arcs.

However, these algorithms are mainly used for applying vectors in 2d graphics and fitting point data to a parametric representation. Their uses are mostly limited to these domains at this time.

Rendering 3-dimensional smooth cylindrical curves is a big problem in computer graphics in that to synthesize images of hair, fur, feathers, and other fine fibers, etc., a very large data set of cylindrical curve structures must be ray-traced, requiring a large amount of memory. Complications in doing this include: 1) curves are typically represented as a set of connected line segments, but due to the large data volume required (i.e., an average hair can consist of hundreds of millions of segments), it becomes computationally very expensive to generate this data and then provide it to a rendering program; 2) rendering of line segments is typically done by ray-tracing geometric capsule primitives, which produces artifacts in the form of angles between individual segments, making them appear tessellated when viewed up close; and 3) modeling of curves is a hard task to manage for a human because of the complexity within each curves' structure.

Thus there is a need for rendering 3-dimensional cylindrical curves with a low volume of data required to represent the curves and ray-tracing the curves using a set of geometric primitives which have implicit curvature to avoid producing angular artifacts.

FIELD OF THE INVENTION

The present inventive concept pertains to the field of computer graphics rendering. More particularly, the present inventive concept pertains to generating representations of geometric primitives (implicit surfaces) from arbitrary polylines and ray-tracing of the geometric primitives with varying thicknesses to render smooth curves with varying thicknesses.

DESCRIPTION OF RELATED ART

FIG. 1 shows a conventional approach to rendering swept tubular curves. As illustrated in FIG. 1, a complex input tubular curve 100 consists of many linear segments 101. For each segment a capped capsule is generated, which includes a cylinder 103 with a hemisphere 105 at each end. Each capsule's radius can be different at start to end to accommodate for the changing radius of the tubular curve 100. During rendering this type of tubular curve 100 is typically sampled to have discrete segments like those illustrated.

FIG. 2 shows an initial polyline 201 including individual line segments 201(a) through 201(d), and radius information 203 at each point (or end) and mid-point of a line segment of the polyline 201. The radius information 203 of the polyline 201 is obtained by simplifying the conventional segmented curve of FIG. 1 using a reducer (not illustrated to provide brevity of the prior art). This can also be directly modeled by a human or can be generated by a program.

FIG. 3 shows a set of torus primitives 301 generated with a primitive generator (not illustrated in order to provide brevity to the instant application). The torus primitives 301 in FIG. 3 have radii 303 and 305, which are constant. This is a conventional approach to generating arc curves for 2-dimensional rendering. Problems with this conventional approach include the rendered curves being forced to have a constant thickness since the radii of each torus primitive remain constant.

FIG. 4 is a flow diagram of a method for ray-tracing implicit surfaces based on arbitrary polylines, such as the polyline in FIGS. 2 and 3. In this flow diagram, first, a polyline consisting of a plurality of linear segments is acquired along with thickness values (step 401). Next, implicit surfaces are generated (step 403) from the arbitrary polyline. The implicit surfaces are then organized with a bounding volume hierarchy (BVH) approach (step 405). An optimizer is known for performing this process. Once the implicit surfaces are generated and organized, they are then ray-traced to render curves (step 407). However, as described above, such rendered curves are forced to have a constant thickness due to using conventional torus arcs, as illustrated in FIG. 3.

SUMMARY OF THE INVENTION

The foregoing and other embodiments of the present inventive concept can be achieved by providing a method of generating geometric primitives from an arbitrary polyline having at least two consecutive line segments, including: generating Dupin cyclide arcs between consecutive line segments of the polyline.

In another example embodiment, if the Dupin cyclide arcs do not extend to the beginning point of the polyline, then further including: generating a cone frustum on the polyline comprising a base point at a root of the polyline, a base having a radius equal to the radius at the root of the polyline, a height equal to half the length of the first line segment of the polyline, and a top radius linearly interpolated between the first point radius and the second point radius of the first line segment.

In another example embodiment, if the Dupin cyclide arcs do not extend to the beginning point of the polyline, then further including: generating cone frustum on the polyline comprising a base point at a middle of the last line segment of the polyline, a base having a radius interpolated using the first point radius and the second point radius of the last segment of the polyline.

In another example embodiment, the Dupin cyclide arcs can be generated by: calculating a normal vector extending from each of the two consecutive line segments and using the intersection point of the vectors as a center point of the Dupin cyclide, a radius of the cyclide arc being the distance between the center point and a start point of one of the vectors; setting a local coordinate system of the Dupin cyclide such that an XY plane is the plane defined by the two normal vectors, the origin being at the intersection of the two normal vectors; choosing an orientation of the X axis; setting a starting and ending angle of the Dupin cyclide arc so that the total arc angle is equal to the angle between the normal vectors; calculating radii at the start point and the end point of the Dupin cyclide arc by interpolation at points where the normal vectors extend from respective line segments using radii at each end of the respective line segments; and displacing the Dupin cyclide arc in the local XY plane until its end points lie on the polyline.

In still another example embodiment, if two consecutive line segments have equal lengths then midpoints of the line segments can be calculated, and normal vectors extend from the respective midpoints.

In yet another example embodiment, if one of consecutive line segments is longer than another, the normal vectors extend from the midpoint of the shorter line segment and a point on the longer segment such that the distance from the calculated point to the line segment's first end is equal to half the length of the shorter line segment.

In yet another example embodiment, an additional cone frustum can be generated and inserted between the calculated point and the next consecutively generated Dupin cyclide arc.

In still another example embodiment, if the primitive preceding the Dupin cyclide arc is a cone frustum, adjusting the cone's height with the length of the displacement component parallel to the first line segment; and if the primitive preceding the Dupin cyclide arc is a Dupin cyclide arc, generating a cone frustum with a height equal to the length of the displacement component parallel to the first line segment and inserting the cone frustum between the two Dupin cyclide arcs; if the primitive following the Dupin cyclide arc is a cone frustum, adjusting the cone's height with the length of the displacement component parallel to the second line segment; and if the primitive preceding the Dupin cyclide arc is a Dupin cyclide arc, generating a cone frustum with a height equal to the length of the displacement component parallel to the second line segment and inserting the cone frustum between the two Dupin cyclide arcs.

The foregoing and other embodiments of the present inventive concept can be achieved by providing a system to render a three-dimensional set of continuous consecutive geometric primitives from a polyline, the system comprising: a primitive generator to generate a representation of a set of consecutive geometric primitives from a set of contiguous points connected by line segments of the polyline using per-point radius data and segment length data; and a primitive processor to ray-trace the consecutive geometric primitives using start and end parameters and arbitrary radii at each end of the consecutive geometric primitives.

In an example embodiment, the system can further include an optimizer to organize the consecutive geometric primitives into a bounding volume hierarchy structure prior to being ray-traced by the primitive processor.

In another example embodiment, the primitive generator can be configured to generate a Dupin cyclide arc between consecutive line segments of the polyline.

In still another example embodiment, the primitive generator can generate the Dupin cyclide arcs by: calculating a normal vector extending from each of two consecutive line segments and using the intersection point of the vectors as a center point of a Dupin cyclide, a radius of the Dupin cyclide arc being the distance between the center point and a start point of one of the vectors; setting a local coordinate system of the Dupin cyclide such that an XY plane is the plane defined by the two normal vectors, the origin being at the intersection of the two normal vectors; choosing an orientation of the X axis (e.g., aligned with the normal vector to the first segment); setting a starting and ending angle of the Dupin cyclide arc so that the total arc angle is equal to the angle between the normal vectors; calculating radii at a start point and an end point of the Dupin cyclide arc by interpolation at points where the normal vectors extend from respective line segments using radii at each end of the respective line segments; and displacing the Dupin cyclide arc in the local XY plane until its end points lie on the polyline.

In still another example embodiment, if the Dupin cyclide arcs do not extend to the beginning of the polyline, then the primitive generator further generates: a cone frustum comprising a base point at a root of the polyline, a base having a radius equal to a radius at the root of the polyline, a height equal to half a length of a first segment of the polyline, and a top radius linearly interpolated between a first endpoint radius and a second endpoint radius of the first segment.

In still another example embodiment, if the Dupin cyclide arcs do not extend to the end of the polyline, then the primitive generator can further generate: a cone frustum comprising a base point at a midpoint between a first end and a second end of a last segment of the polyline, a base having a radius equal to a radius interpolated using the first endpoint radius and the second endpoint radius of the last segment and a top having a radius equal to the radius at the last line segment of the polyline.

In yet another example embodiment, the primitive processor can traverse each of a plurality of bounding boxes generated by the optimizer to find a set of bounding boxes which intersect with a ray acquired from a ray-tracing algorithm.

The foregoing and other embodiments of the present inventive concept can be achieved by providing a method of producing a representation of an infinitely smooth curve from a set of geometric primitives, including: generating rays to trace each of the geometric primitives; determining whether the generated rays intersect respective surfaces of the geometric primitives; and determining, for the intersections that do occur, whether the intersections occur within an angle formed between two vectors that are used to generate a corresponding Dupin cyclide arc of each generated geometric primitive.

In an example embodiment, the determining whether the generated rays intersect respective surfaces of the geometric primitives includes using variables of the geometric primitives aligned in a Cartesian coordinate graph.

In another example embodiment, the method may further include organizing the set of geometric primitives into a bounding volume hierarchy structure prior to generating the rays.

BRIEF DESCRIPTION OF THE DRAWING

FIGS. 5A-5G shows examples of different types of implicit surfaces that can be used for ray-tracing curves according to exemplary embodiments of the present inventive concept;

FIG. 7 shows a flow diagram of a method of generating implicit surfaces from an arbitrary polyline, according to an exemplary embodiment of the present inventive concept;

DETAILED DESCRIPTION OF THE INVENTIVE CONCEPT

Figure 1:
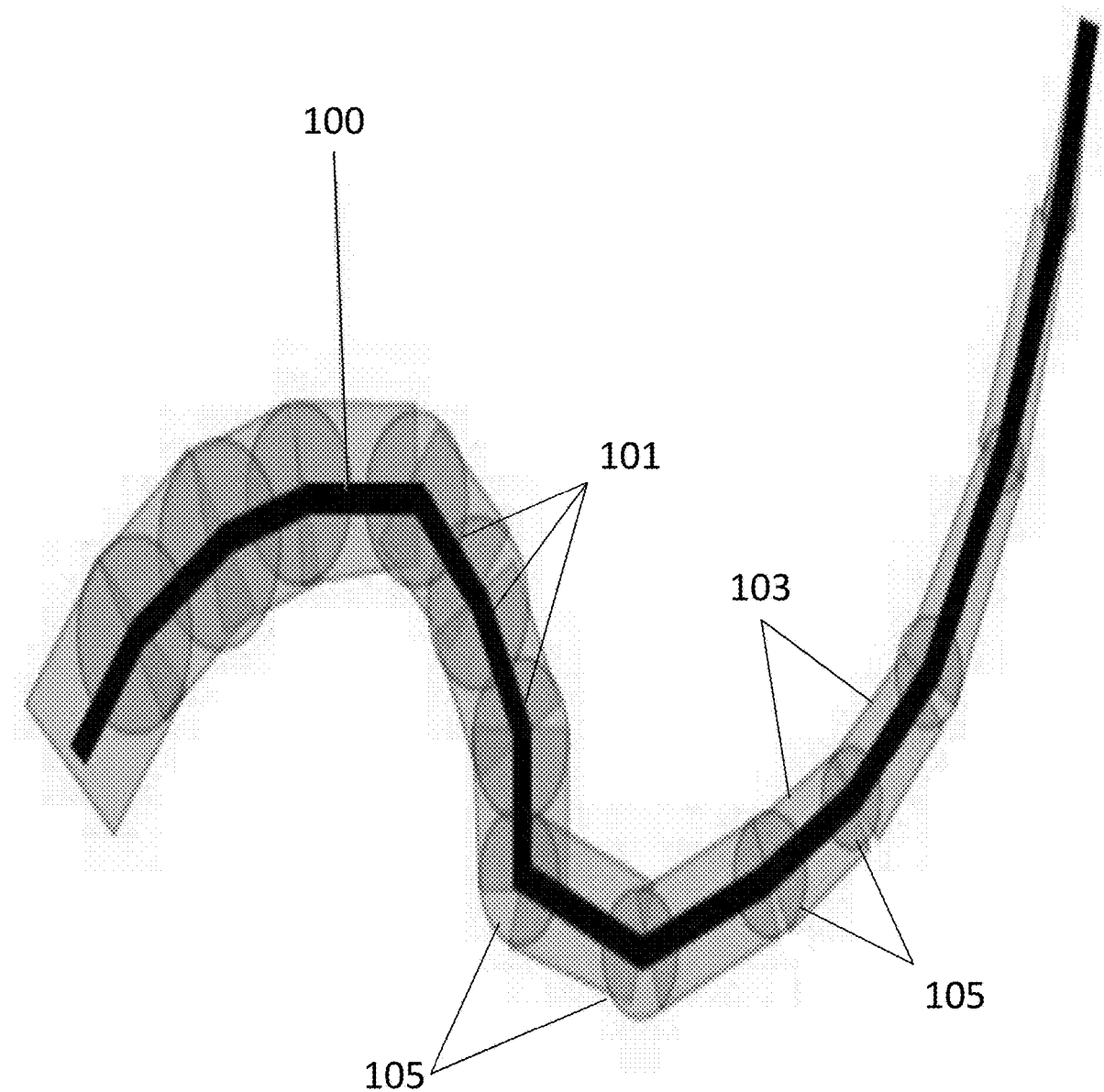
FIG. 1 shows a conventional method of rendering swept tubular curves using capsule segments.
Figure 2:
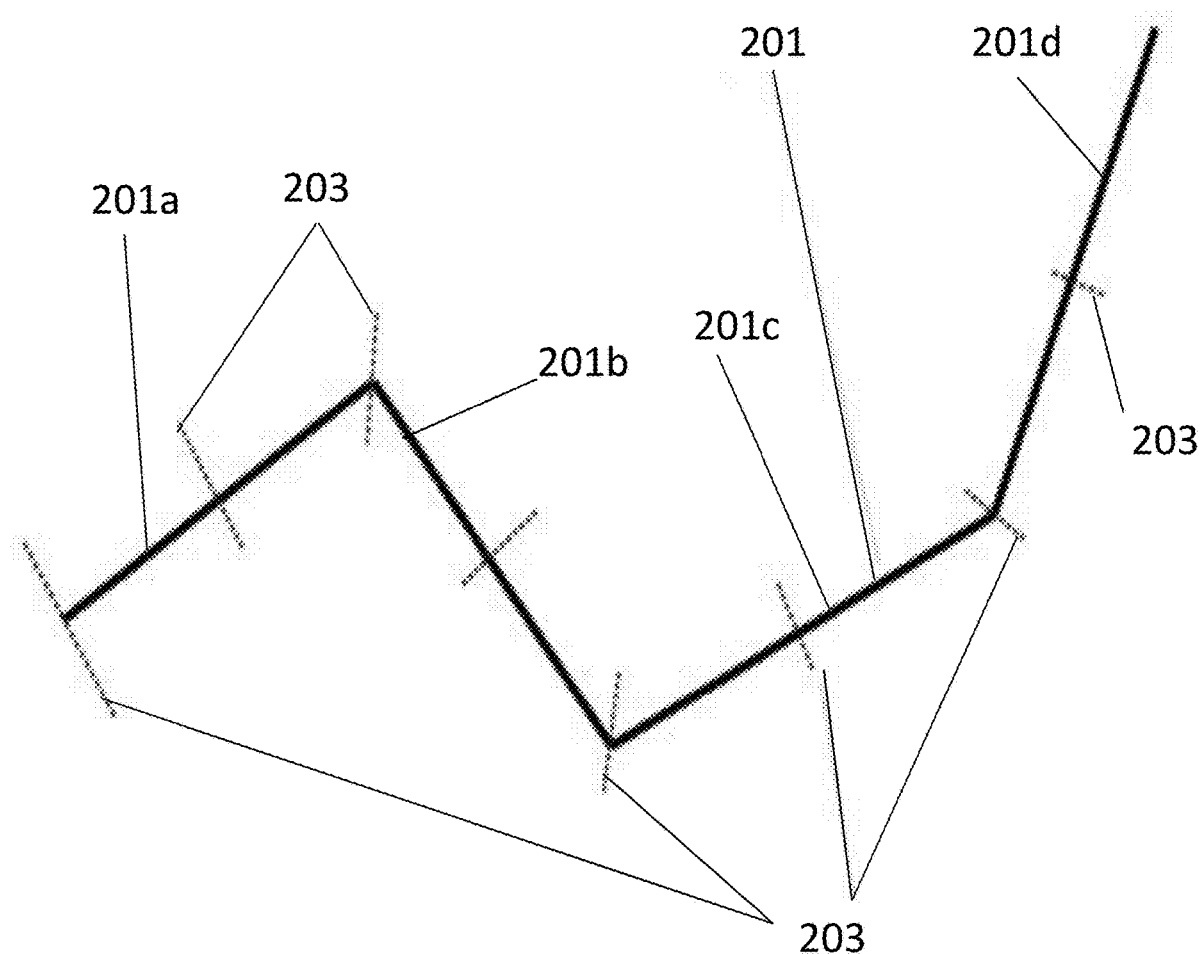
FIG. 2 shows a polyline 201 and radius information 203 at each point and mid-point, which can be obtained by simplifying the conventional segmented curve of FIG. 1.
Figure 3:
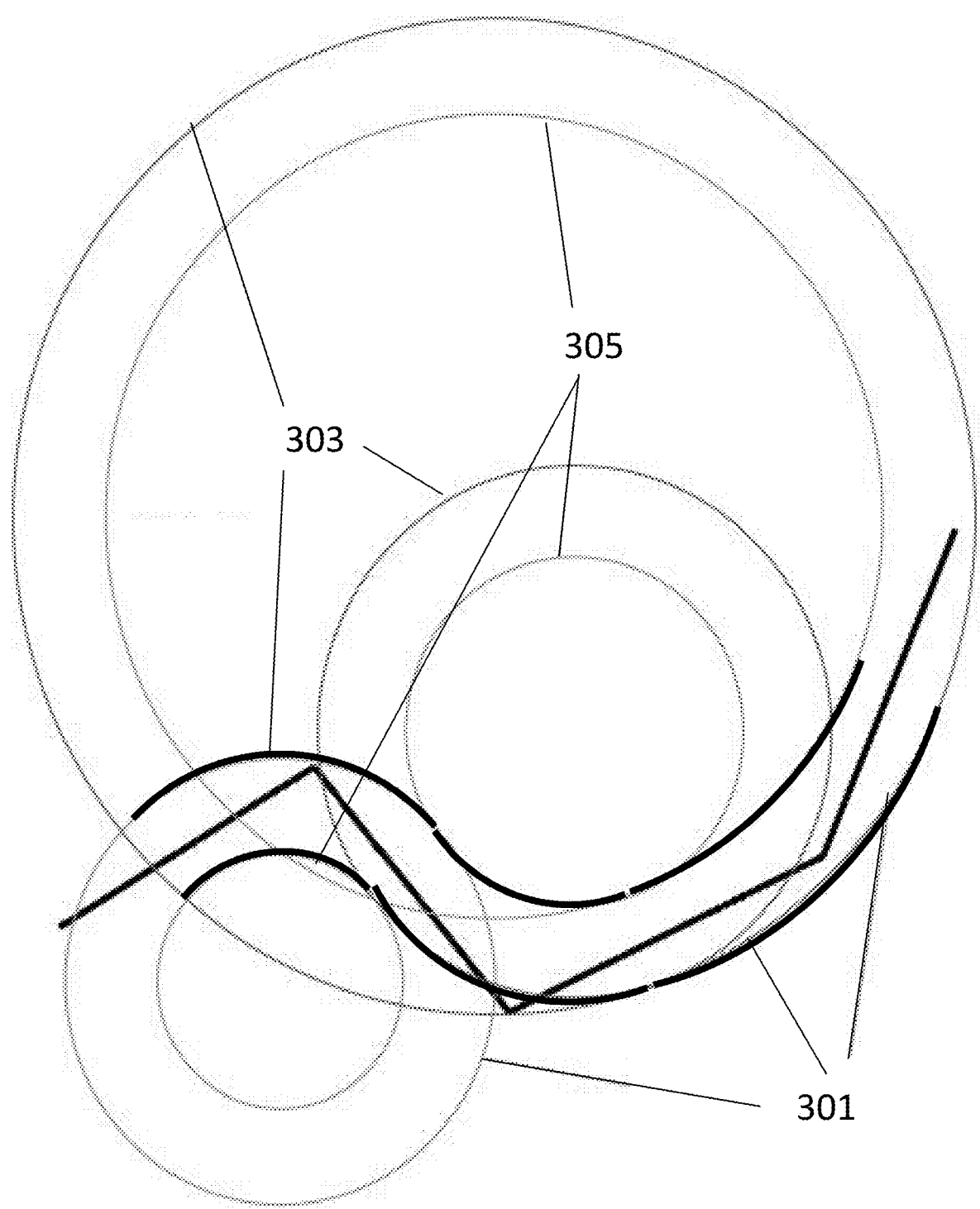
FIG. 3 shows a conventional method of generating arc curves for 2-dimensional rendering.
Figure 4:
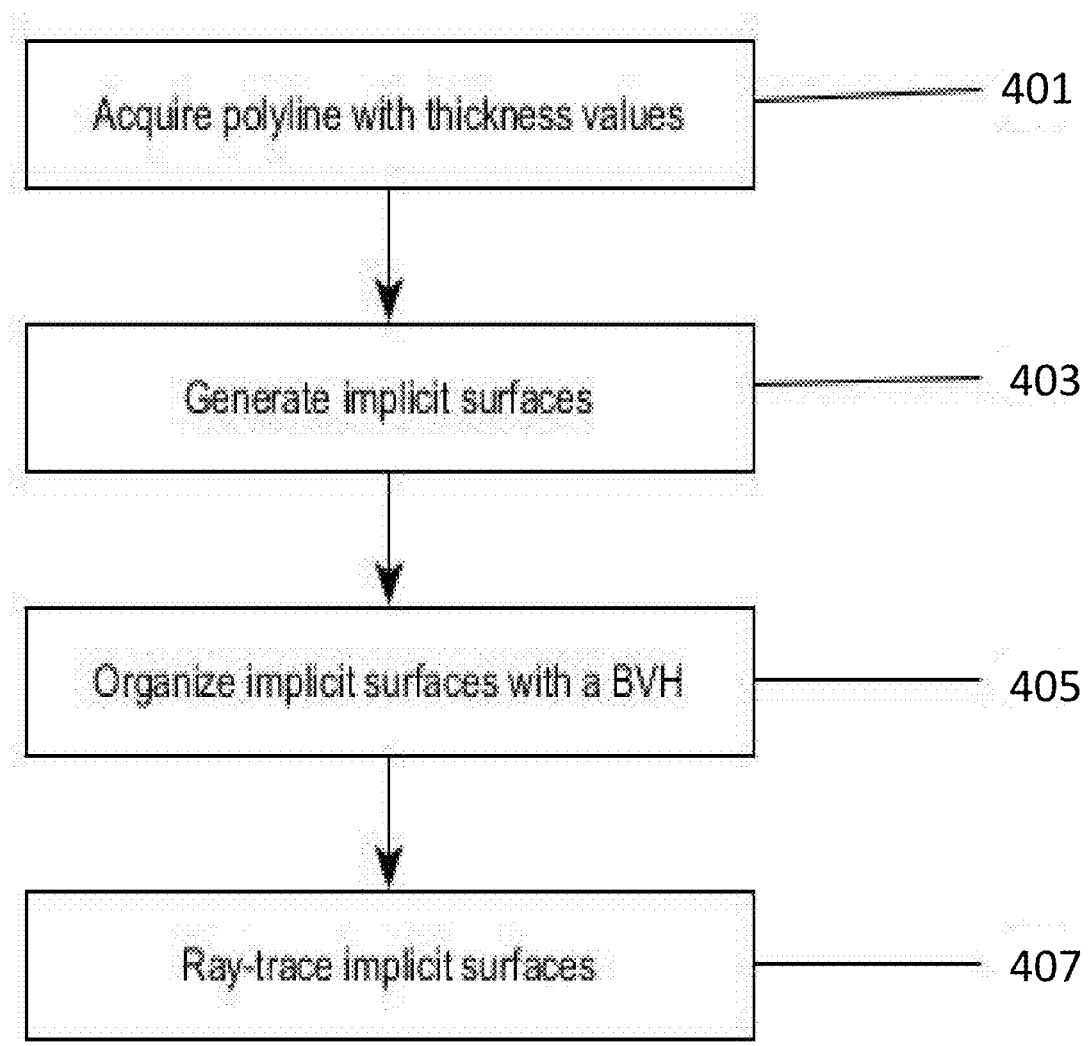
FIG. 4 shows a flow diagram of a conventional method for generating implicit surfaces from a polyline and ray-tracing them to render smooth curves.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings, and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As discussed above, the present inventive concept pertains to the field of computer graphics rendering, and more particularly, the present inventive concept pertains to generating representations of geometric primitives (implicit surfaces) from arbitrary polylines and ray-tracing of the geometric primitives to render smooth curves with varying thickness.

FIGS. 5A through 5G illustrate examples of different types of geometric primitives (or implicit surfaces) that can be generated according to exemplary embodiments of the present inventive concept, and used for ray-tracing to render a representation of infinitely smooth curves according to exemplary embodiments of the present inventive concept. FIG. 5A illustrates a Dupin cyclide, which is any geometric inversion of a standard torus, cylinder or double cone, FIG. 5B illustrates a torus, FIG. 5C illustrates a Dupin cyclide arc, FIG. 5D illustrates a torus arc which is used to generate a representation of smooth three-dimensional curves comprising primitives according to embodiments of the present inventive concept, FIG. 5E illustrates a cylinder, FIG. 5F illustrates a cone frustum and FIG. 5G illustrates a capsule.

FIGS. 6A through 6I illustrate how a representation of curves can be generated with smooth implicit canal surfaces according to exemplary embodiments of the present inventive concept. Such a representation of curves with smooth implicit canal surfaces can be used to produce fast high quality renders using a minimal amount of control points to generate geometric variables of the curves according to exemplary embodiments of the present inventive concept.

A "reducer" is generally a program that can be used to reduce an arbitrarily defined curve to a minimal "polyline" which will approximate the curve to a desired accuracy. A polyline is a series of points connected by line segments, including per-point thickness information. Such polylines can be created directly by a user or can be generated by a reducer.

Figure 6A:
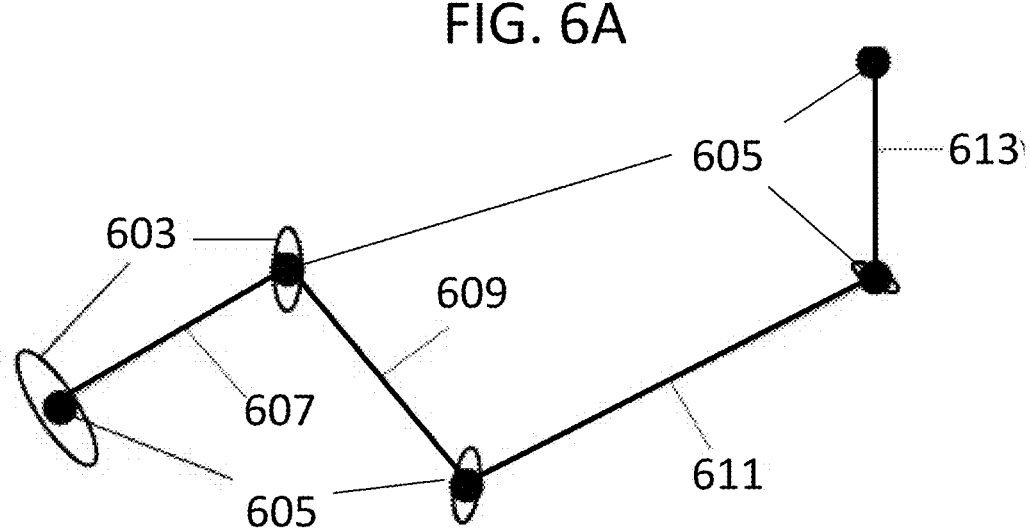
FIGS. 6A through 6I show steps of generating implicit surfaces from an arbitrary polyline, according to exemplary embodiments of the present inventive concept.
Figure 6B:
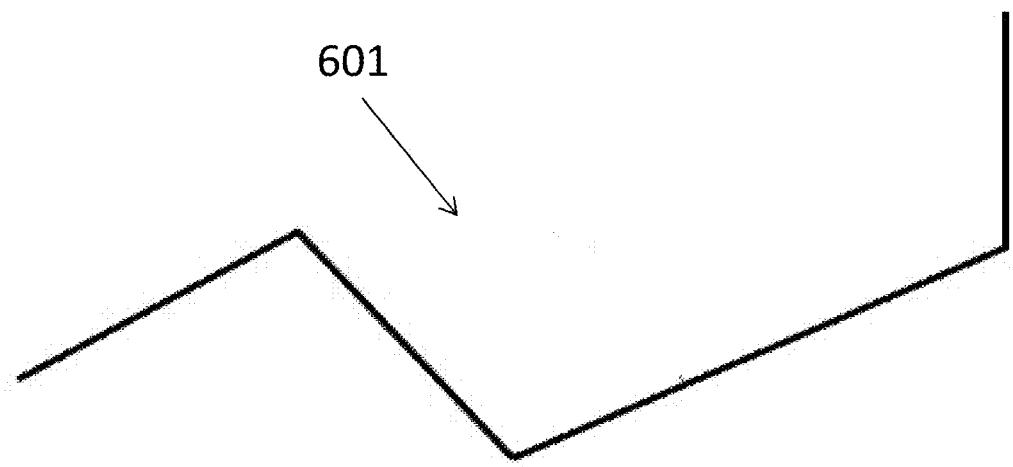

FIG. 6A illustrates how a set of three-dimensional points 605 of a curve are first acquired, which together define the positions of separate line segments 607, 609, 611 and 613 of a polyline curve 601 (FIG. 6B). The three-dimensional points 605 together define the overall positioning of the polyline curve 601. FIG. 6A also illustrates determining the thickness of resulting polyline curve 601 by acquiring a set of radius values 603, one at each three-dimensional point 605. With this acquired information a three-dimensional seamless set of ray-traceable geometric primitives can be generated to represent an arbitrary polyline in three-dimensional space, according to exemplary embodiments of the present inventive concept.

Using the acquired information of radii 603 and points 605 as described above with reference to FIG. 6A, a representation of a set of smooth implicit surfaces (or geometric primitives) can be generated from the polyline curve 601 by a "primitive generator" according to an exemplary embodiment of the present inventive concept. More specifically, the primitive generator as described herein can convert polylines into a set of geometric primitives forming a continuous surface. A geometric primitive is described by a three-dimensional function, start and end ranges on the function, and a sweeping radius (thickness) at the start and end points of the range. Such three-dimensional functions can be, for example, a cone, a torus or a cylinder, as illustrated in FIGS. 5A through 5G. After the geometric primitives are created by the primitive generator, an "optimizer" can then organize the generated geometric primitives into an optimization structure such as a Bounding Volume Hierarchy (BVH) prior to being ray-traced. More specifically, for each geometric primitive generated by the primitive generator according to an example embodiment of the present inventive concept, an axis-aligned bounding box can be computed based on its base line segment and radii at each end. The bounding box is then inserted into a bounding volume hierarchy structure.

The primitive generator and the optimizer as described above can each be devices and/or programs configured to perform the functions described herein.

FIGS. 6C through 6I illustrate operations performed by the primitive generator according to exemplary embodiments of the present inventive concept.

Figure 6C:
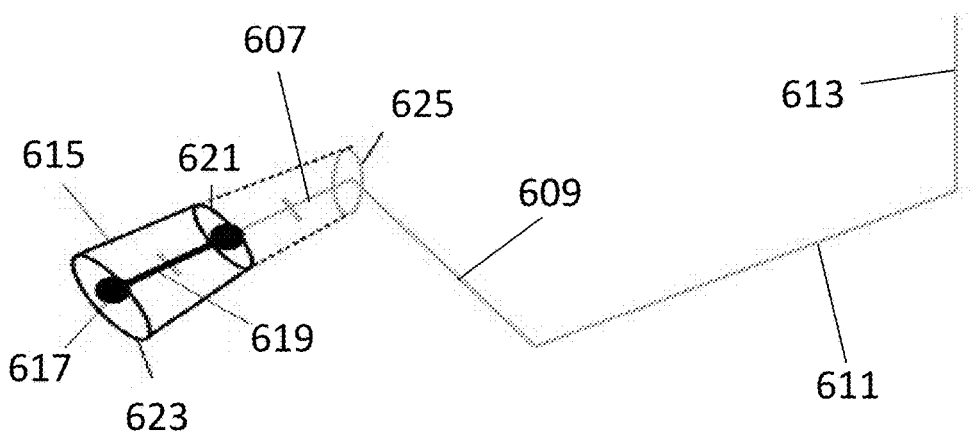

Referring to FIG. 6C, a cone frustum 615 (as illustrated in FIG. 5F) can be generated and inserted into the polyline diagram of FIG. 6B at the first segment 607 such that a base point 617 lies at the root (beginning) of the polyline 601. The cone frustum 615 can be generated as follows. The base of the cone frustum 615 (at point 617) has a radius 623, which value is one of the acquired radii 603 of FIG. 6A, equal to the radius at the root of the polyline. A height 619 of the cone frustum 615 can be calculated to be equal to half the length of the first segment 607 (acquired data from points 605), and a top radius 621 of the cone frustum 615 can be linearly interpolated as the mid-point between the first point radius 623 and a second point radius 625 of the first line segment 607. The second point radius 625, similar to the first point radius 623, is one of the acquired radius values 603 as described above.

If, for example, the radius 623 at the base of the cone frustum 615 was equal to the radius 625 at the top of the cone frustum 615, then a cylinder shape frustum could be inserted instead of a cone frustum. However, due to the acquired radii 623 and 625 being different at the base and top of the first line segment 607 (radius 623 being larger than radius 625), a cone frustum is generated and inserted to represent a first geometric primitive.

Between all subsequent consecutive line segments 607, 609, 611 and 613 of the polyline, a Dupin cyclide can be generated as described below. It is to be noted first that there are three possible cases when generating a Dupin cycle between segments: 1) the first case being where a next segment's length is equal to the current segment's length; 2) the second case being where a next segment is longer than the current segment; and 3) the third case being where a next segment is shorter than the current segment, which will each be describe in more detail below.

Figure 6D:
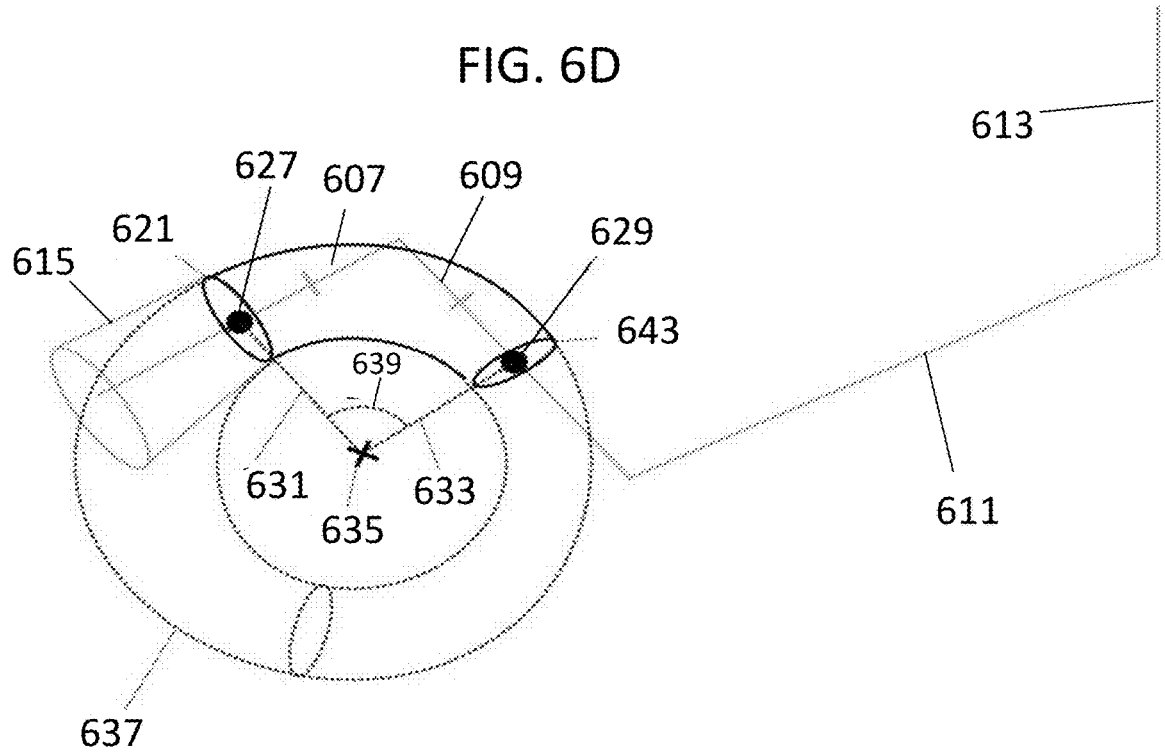

Referring to FIG. 6D, first, since line segments 607 and 609 have been determined to have equal lengths by acquiring the line segment data, midpoints 627 and 629 of line segments 607 and 609, respectively, are first calculated using the data of the ends of the line segments. From each midpoint 627 and 629 a normal vector 631 and 633 is calculated, respectively such that the normal vectors 631 and 633 are perpendicular to their respective line segments 607 and 609 and lie in a plane formed by the line segments 607 and 609. An intersection point 635 of the projecting normal vectors 631 and 633 is calculated to yield a center point of a Dupin cyclide 637. Since the line segments 607 and 609 have been determined to be the same length in this case, the radius of the Dupin cyclide arc 637 is calculated as a distance between the center point 635 and one of the mid points 627 or 629 of the line segments 607 and 609 (the length of either vector 631 or 633).

It is to be noted that only a portion (i.e., an arc) of a Dupin cyclide is needed to exist between two adjacent line segments (i.e., segments 607 and 609) to form a representation of a geometric primitive according to exemplary embodiments of the present inventive concept.

Referring back to FIG. 5D, a Dupin cyclide arc 104 required to form a representation of a smooth implicit surface is defined by the position of the cyclide center 503, the axes X, Y, and Z (which together define the local coordinate space of the cyclide), and the arc angle A which starts at the X axis of the plane XY and goes around the plane in the counter-clockwise direction. Therefore, a Dupin cyclide arc between the two adjacent segments 607 and 609 (FIG. 6D) can be formed as follows. The geometrical center of the Dupin cyclide is placed at point 635. The X-axis of the Dupin cyclide arc 104 (referring back to FIG. 5D) can be aligned with the end point of the previous primitive, which is the end of the cone 615. This can be achieved by aligning the X axis with vector 631, perpendicular to line segment 607. At this point the Y and Z axes are still freely rotatable around vector 631. The Y axis is chosen so that vector 633 is in the XY plane Next, the orientation of the Y and Z axes is chosen so that the end point 643 lies in the XY plane (the vertical axis Z is perpendicular to the plane of the drawing). Therefore angle A of FIG. 5D will be equivalent to angle 639 of FIG. 6D.

A final adjustment step is necessary when the radii 621 and 643 at each end of the Dupin cyclide arc are not equal. In this case, as illustrated in FIGS. 6D(1) and 6D(2), the directrix of the cyclide is an ellipse. Therefore, when the cyclide arc is constructed as described above, its final point does not lie on the polyline (FIG. 6D(1)). This can be corrected by shifting the entire Dupin cyclide arc along its local Y axis by the displacement 671 (FIG. 6D(1)) until its final point coincides with the point 629 on the polyline (FIG. 6D(2)). Via this shift, the cyclide arc center 635 is displaced to a new position 636 and the initial point of the cyclide 627 is displaced to a new position 628. In order to restore the continuity of the surface represented by the generated sequence of primitives, the previous primitive is also corrected as follows: 1) if the previous primitive is a cone frustum, its height can be increased by the length of the displacement 671, so that its final point becomes the new point 628; or 2) if the previous primitive is a Dupin cyclide arc, an additional cone frustum can be inserted between points 627 and 628. Thus, in the case shown in FIG. 6D, the height of the cone frustum 615 will be increased by the calculated length of the displacement 671.

The exact calculation of the Dupin cyclide parameters (including the displacement) from the arc radius (631, 633), arc angle (639), initial radius (621) and final radius (643) is described in Appendix 1.

Other orientations of the Dupin cyclide local X and Y axes can also be chosen, in which the XY plane remains the same plane defined by the intersecting segments. For example, the X axis can be aligned with the following primitive instead of the preceding one. Or, the X axis can be rotated at a predetermined angle to define a different starting angle of the Dupin cyclide arc. Following the same process (FIG. 6D(3)), a displacement 673 in the XY plane can be calculated from the cyclide equations in Appendix 1, such that will place the starting point of the cyclide arc 675 on segment 607 and the end point of the cyclide arc 677 on segment 609. Cone frustums can then be inserted between the cyclide arc and neighboring primitives in order to maintain the continuity of the resulting surface. The height of each inserted cone frustum is equal to the length of the component of the displacement vector parallel to the corresponding line segment: 607 for the preceding primitive and 609 for the following primitive.

In other words, the Dupin cyclide arc of FIG. 6D is created by aligning a Dupin cyclide arc (FIG. 5D) with the normal vectors 631 and 633 in order to generate and place the Dupin cyclide arc into the final coordinates of the polyline 601. Thus, as pointed out above, the angle A of FIG. 5D becomes the angle 639 of FIG. 6D, and the end points of the Dupin cyclide arc, lying on its central curve (directrix), become the calculated data points 628 and 629. The radii 621 and 643 at each end of the Dupin cyclide arc of FIG. 6D are set to values that are interpolated at the midpoints 627 and 629 of the segments 607 and 609 using the minimal data acquired of the lines segments 607 and 609 (see above description regarding determining the radius 621 at the midpoint of line segment 607). If both end points of the generated Dupin cyclide arc (from Dupin cyclide 637) have the same radius, i.e., radii 621 and 643 are calculated to be the same, then a torus arc (i.e., FIG. 5D) would be the represented primitive here instead, as described above. However, in this case the generated Dupin cyclide arc is not a torus shape since the radii 621 and 643 are determined not to be the same (radius 621 has been calculated to be greater than radius 643).

The same algorithm (generating Dupin cyclide arcs between each two segments) as used for segments with equal length (see above described algorithm with respect to segments 607, 609) can be applied to other consecutive segments where the first segment of the two line segments is shorter than the next consecutive line segment. For example, referring to FIG. 6E, line segment 609 is determined to be shorter than the next consecutive line segment 611. Therefore, the complete segment 609 can be used to determine the next Dupin cyclide 641 between line segments 609 and 611. A portion of the consecutive line segment 611 that has the same length as line segment 609 can then be determined as follows. The midpoint 629 of line segment 609 can be determined by interpolation using the known values of points at each end of line segment 609, as described above. It is to be noted that the radius at midpoint 629 has already been calculated during the generation of Dupin cyclide 637 with reference to FIG. 6D. Then a point along line segment 611 can be determined, which is the same distance away from end-point 645 as is the midpoint 629. This point 649 will be the point of the determined portion of line segment 611.

Figure 6E:
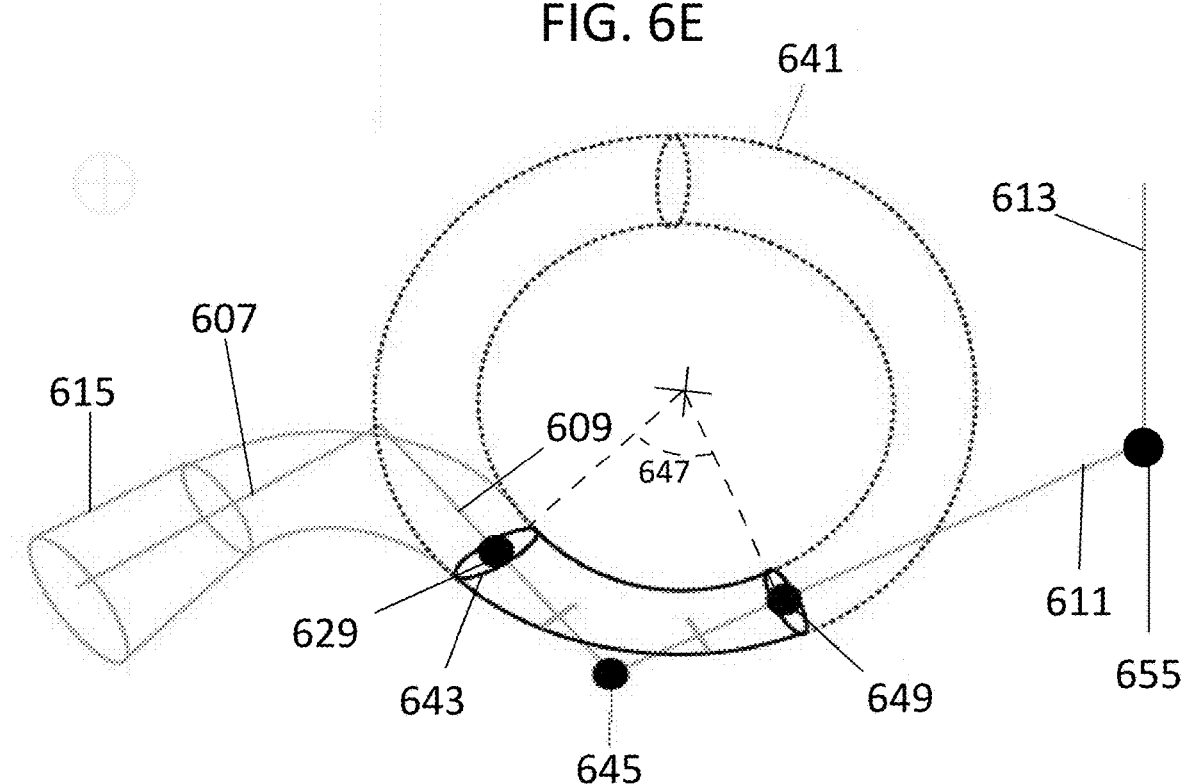

These two lines segments (line segment between midpoint 629 and endpoint 645 and line segment between point 649 and endpoint 645) are then used to generate the Dupin cyclide 641 as illustrated in FIG. 6E. In other words, in this case the Dupin cyclide 641 is generated similar to the way that Dupin cyclide 637 of FIG. 6D was generated. More specifically, from each point 629 and 649 a normal vector is calculated such that the normal vectors are perpendicular to their respective line segments 609 and 611 and lie in a plane formed by the line segments 609 and 611. An intersection point of the projecting normal vectors is calculated to yield a center point of a generated Dupin cyclide 641.

Since the line segment between points 629 and 645 is the same length as the line segment between points 649 and 645, the radius of the Dupin cyclide 641 is calculated to be the distance of either of the vectors extending from line segment 609 or line segment 611 to the point where these two vectors intersect.

A Dupin cyclide arc for the generated Dupin cyclide 641 can then be formed using the same procedure as described above with respect to the Dupin cyclide 637. The angle A of FIG. 5D becomes the angle 647 where the vectors extending from points 629 and 649 intersect, and the end points of the Dupin cyclide arc will be points 629 and 649. As described above, the X axis of FIG. 5D becomes aligned with the vector positioned where the previous Dupin torus ended, which in this case is the vector extending from line 609 at point 629.

The radii at points 629 and 649 and at each end of the Dupin cyclide arc of FIG. 6E are set to be radii that are interpolated using acquired end point data of line segments 609 and 611 (see above regarding determining the radius 621 at the midpoint of line segment 607). In other words, the radius at point 649 can be linearly interpolated using the radius data at start point 645 and the radius data at endpoint 655 (similar to the radius at start point 645, the radius at point 655 is one of the acquired radii values 603 as described above) of line segment 611. If both ends of a Dupin cyclide arc have the same radius (i.e., the radii at midpoints 629 and 649 were calculated to be the same) then a torus arc (i.e., FIG. 5D) would be the resulting represented geometric primitive here, as described above. However, in this case the generated Dupin cyclide arc between line segments 609 and 611 is not a torus shape since the radii at points 629 and 649 were calculated to be different. More specifically, the radius at point 629 was determined to be greater than the radius at point 649 when the radii values 603 were acquired.

Using the algorithms described above, the primitive generator according to an exemplary embodiment of the present inventive concept can generate a representation of a geometric primitive of a smooth curve using, for example, data such as start and end coordinates of line segments, lengths of the line segments and radii at start and end points of the line segments.

Figure 6F:
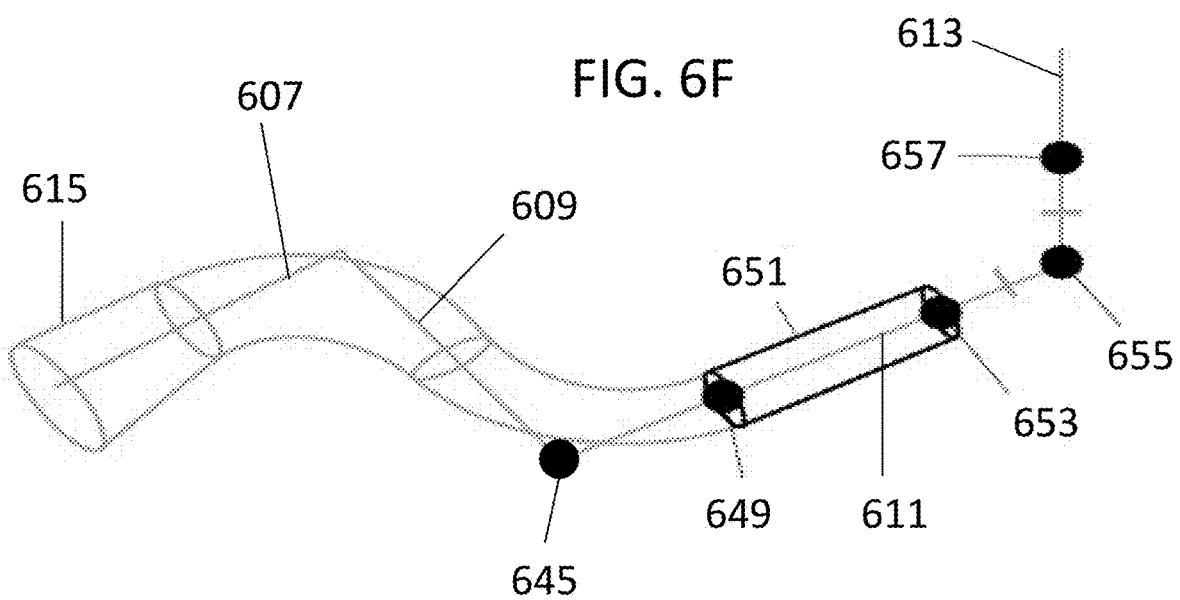
Figure 6G:
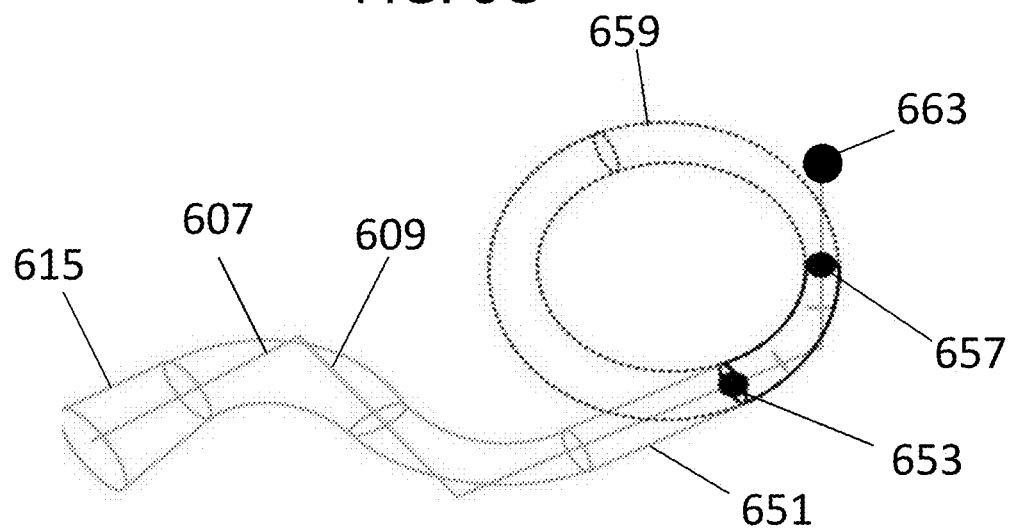

When one of the consecutive line segments of a polyline is longer than the other, such as consecutive segments 609 and 611, an additional cone frustum 651 can be generated and inserted along the longer line segment (line segment 611) to blend between consecutively generated Dupin cyclides 641 and 659 (explained in FIGS. 6F and 6G, respectively). The primitive type, including its start and end coordinates, angles, lengths and radii of this cone frustum 651 can then be determined by the primitive generator as follows. If the subsequent line segment 613 is shorter than the previous line segment 611, then a point 653 on the longer line segment 611 can then be calculated as a point that is the same distance from point 655 between the line segments 611 and 613 as half the length of the shorter segment 613. As with the first generated cone frustum 615 (FIG. 6C), the radius at point 653 can be calculated through linear interpolation using the previously calculated radius at point 649 and the previously acquired radius value 603 at endpoint 655. A cone frustum 651 can then be generated and inserted between the calculated point 649 at the end of the previous generated Dupin cyclide arc (of Dupin cyclide 641) and the calculated point 653.

A Dupin cyclide 659 (FIG. 6G) can then be generated by the primitive generator similar to the previously generated Dupin cyclides 637 and 641, as described above. The radius at the midpoint 657 of line segment 613 can be interpolated using the acquired information for the line segment 613 and the previously acquired radii values 603 of endpoints 655 and 663 of line segment 613. A Dupin cyclide arc to extend between lines segments 611 and 613 can then be generated using the same algorithm described above with respect to generating the Dupin cyclide arcs between line segments 607 and 609 and between line segments 609 and 611. This Dupin cyclide arc obtained from generating Dupin cyclide 659 will extend between the calculated point 653 and the midpoint 657 (obtained by interpolation) of the shorter line segment 613.

It is to be noted that if a line segment following a longer line segment (i.e., line segment 611 being the "longer line segment" than the preceding line segment 609) is also longer than its preceding segment (i.e., line segment 613 being longer than "longer" line segment 611), then a cone frustum, such as cone frustum 651 along line segment 611, would not be generated and inserted between the point 649 at the end of the previous Dupin cyclide arc and the calculated point 653. In fact, point 653 need not be calculated. Instead, a Dupin cyclide can be generated between the previous calculated point (such as point 649 of line segment 611) on the first of the two current line segments (segment 611) and an interpolated point along line segment 613, wherein the interpolated point along line segment 613 would be the same length as the length between the point at the end of the previous Dupin cyclide arc (i.e., point 649) and the endpoint 655 between line segments 611 and 613.

The process of inserting Dupin cyclides, and hence Dupin cyclide arcs, and cone frustums, between each of two consecutive line segments can be repeated for all line segments along a polyline, according to the algorithms described above, according to exemplary embodiments of the present inventive concept.

Figure 6H:
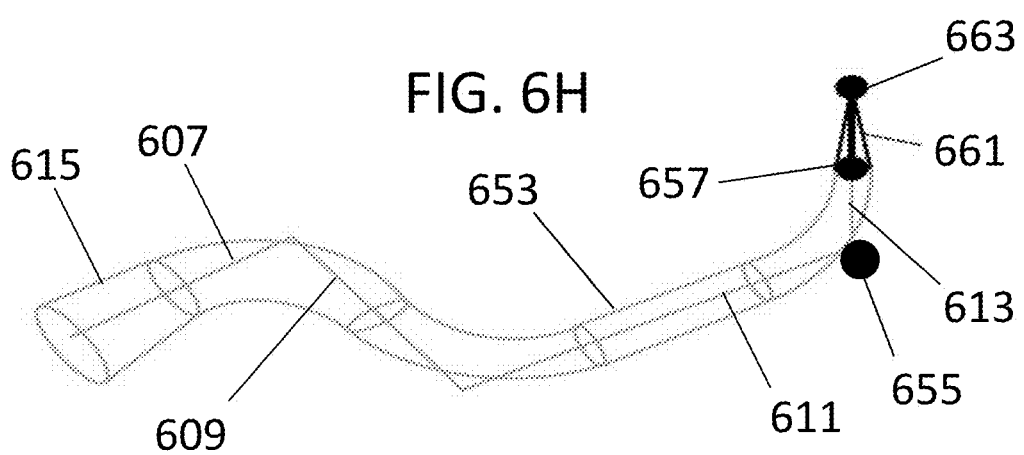

Referring to FIG. 6H, a cone frustum 661 can then be inserted along the line segment 613 at the end of the Dupin cyclide arc 659 such that a base point of the cone frustum 661 lies at the middle of the last polyline segment 613, and hence an extension of the Dupin cyclide arc extending between line segments 611 and 613. The base's radius of the cone frustum 661 can be calculated by interpolation using the radius value of calculated point 657, which was previously interpolated using the information acquired for endpoints 655 and 663, as well as the length of the segment extending from point 657 to the endpoint 663. As pointed out above, the height of the cone frustum 661 in this case will be equal to the remaining half the length of the line segment 613, and the top of the cone frustum 661 will have the same radius as at the tip of the polyline 601, which is one of the previously acquired radii values 603. If the last consecutive line segment 613 is longer than its preceding line segment 611, then the base 657 of the cone frustum 661 is calculated by using the last end point of the last inserted Dupin cyclide arc in the same polyline.

Figure 6I:
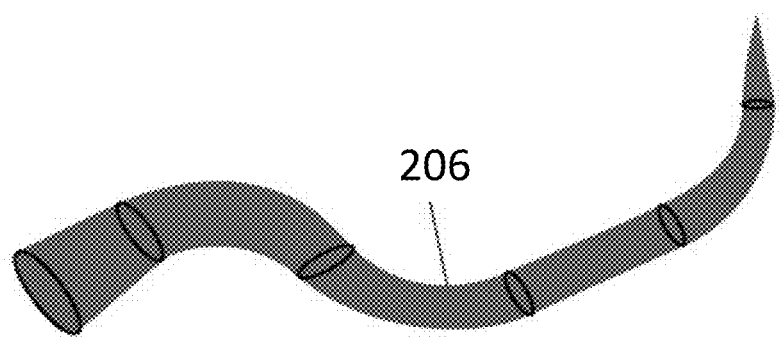

FIG. 6I illustrates the generated representation 206 of a set of three-dimensional smooth geometric primitives with implicit curvatures and variations in thicknesses using the obtained three-dimensional points of the polyline 601. This generated representation 206, as pointed out above, is generated using the primitive generator according to an exemplary embodiment of the present inventive concept.

FIG. 7 illustrates a method of generating a representation of smooth three-dimensional geometric primitives, which can be performed using the primitive generator according to an exemplary embodiment of the present inventive concept, as described above. Referring to FIG. 7, a polyline with thickness values can be first acquired (step 701). Then a cone frustum can be generated and inserted from a root to a middle of a first line segment of the polyline (step 703). Then between each two line segments of the polyline, Dupin cyclide arcs can be generated and inserted (step 705). Next, where the consecutive line segments with varying lengths are present, cone frustums can be generated and inserted between disjointed Dupin cyclide arcs for blending (step 707). Finally, generate and insert a cone frustum at the end of the Dupin cyclide arc on the last line segment (step 709).

Referring back to FIG. 6I, these generated representations 206 of geometric primitives can then be analyzed, sorted, and organized into an optimization structure using the optimizer described above. A "primitive processor" according to an exemplary embodiment of the present inventive concept can take the variables of the geometric primitives generated by the primitive generator and determine whether a ray intersects with each surface type (cone frustum or Dupin cyclide arc). In the case of a Dupin cyclide arc, if an intersection is determined to have occurred, then the primitive processor can check whether the intersection occurred on the part of the cyclide arc which exists within the angle calculated to form the Dupin cyclide arc. If the answer is yes, then the point in space where the intersection occurred and additional information, such as the normal vector to the surface at the point of the intersection is calculated. In other words, the primitive processor calculates whether intersections with rays occur and where the intersections with rays occur. Prior to this process, the primitive optimizer can be used to reduce the complexity of searching for which primitives are hit by a ray and which ones are not hit in the overall shape. This process by the optimizer can be performed by creating approximations of each primitive (using bounding volumes) and quickly discarding any of the approximations if a ray doesn't intersect the bounding volumes. Performing tests with a hierarchy of bounding volumes takes fewer calculations and thus speeds up the ray tracing process. Thus, the primitive processor can ray-trace the optimized representation of the geometric primitives together to produce a representation of an infinitely smooth curve.

It is to be noted that the primitive processor according to an exemplary embodiment of the present inventive concept can perform the above described process without the aid of an optimizer. An optimizer can be implemented prior to the primitive processor to help speed up the process performed by the primitive processor.

Figure 8A:
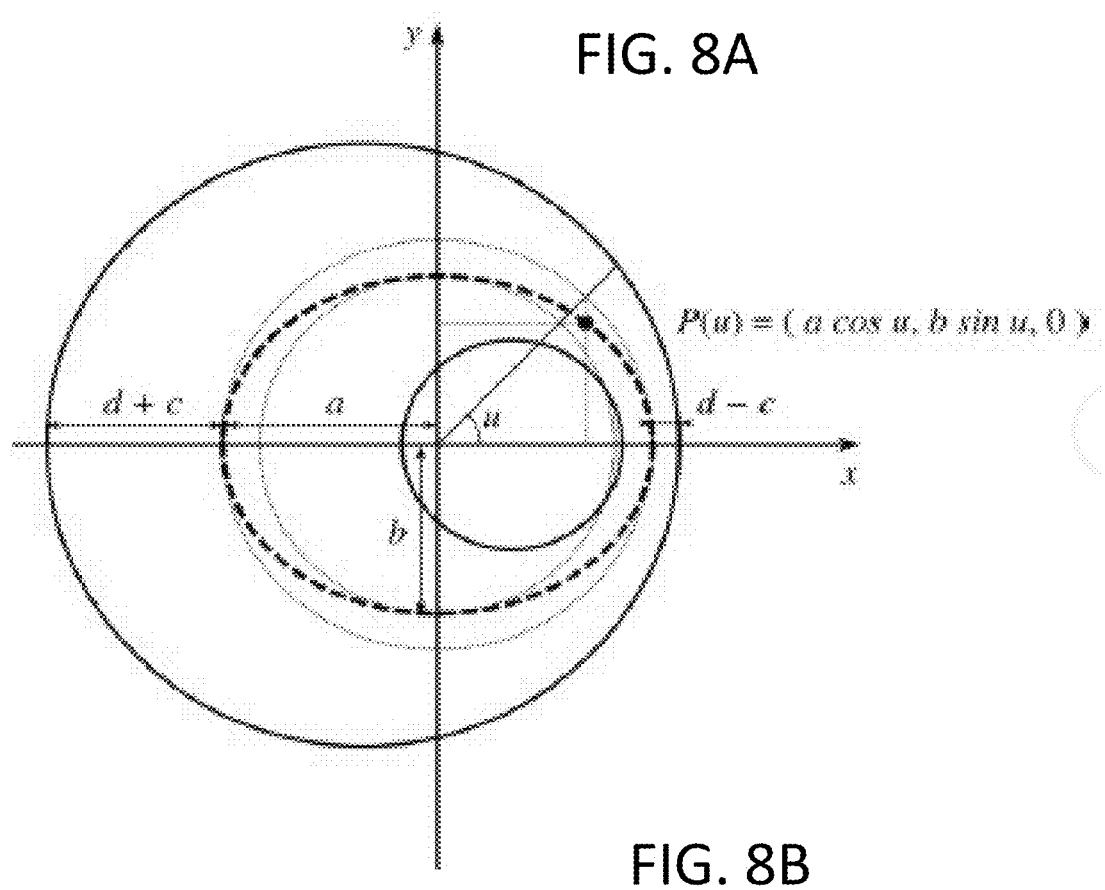
FIGS. 8A and 8B show graphic representations of parameters and notations of a generated representation of a Dupin cyclide arc used for ray-tracing to find an intersection point with the Dupin cyclide arc, according to an exemplary embodiment of the present inventive concept.
Figure 8B:
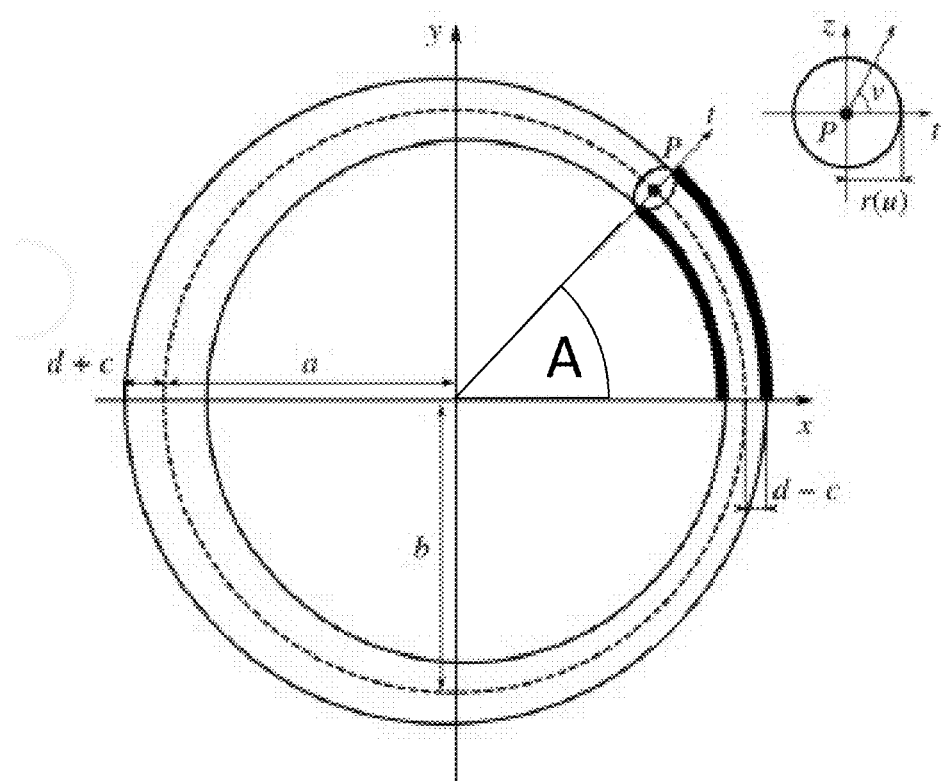

FIGS. 8A and 8B show how the primitive generator uses technical computations/algorithms to complete the processes described above, and yields a final continuous surface. The primitive processor takes an arbitrary ray and finds intersection points with the Dupin cyclide arcs and cone frustums generated by the primitive generator as described above, while using variables generated by the primitive generator as described above with reference to FIGS. 5A through 5G and FIGS. 6A through 6I and Appendix 1. As pointed out above, the primitive processor can ray-trace the optimized representation of the geometric primitives using the primitive types, their start and end coordinates, lengths and radii generated by the primitive generator according to an embodiment of the present inventive concept.

APPENDIX 1: EQUATIONS AND PARAMETERS OF DUPIN CYCLIDE ARC PRIMITIVES

In FIGS. 8A and 8B the parameters and notation of a Dupin cyclide used in the equations below employed by the primitive generator and primitive processor are illustrated. The director ellipse of the illustrated Dupin cyclide is shown with a dashed line in FIG. 8A. The segment used for variable radius blending is shown with a thick black line in FIG. 8B. The Dupin cyclide of FIGS. 8A and 8B is represented in Cartesian coordinates as follows:

$$x = \frac{(c - a \cos u \cos v) + b^2 \cos u}{a - c \cos u \cos v}$$

$$y = \frac{b \sin u (a - d \cos v)}{a - c \cos u \cos v}$$

$$z = \frac{b \sin v (c \cos u - d)}{a - c \cos u \cos v}$$

Where:
u and v are the angles shown in the figure,
a>0 is the radius of the major director circle,
$b^2 = a^2 - c^2$,
a>|c|, and
d>|c|, to have a ring cyclide.

The maximum and minimum radii of the cyclide's vertical cross-section correspond to u=0 and u=π and are:

$$r_{max} = d + |c|,$$

$$r_{min} = d - |c|.$$

The radius of the cross-section at an arbitrary value of the parameter u is given by $$r(u) = d - c \cos u.$$

In the described algorithm for generating geometric primitives for rendering a polyline, the parameters a, b, c, and d of a Dupin cyclide primitive segment (FIG. 8B) have to be calculated from the arc angle (A), arc radius (R), and the radii at start ($r_1$) and end point ($r_2$) of each segment.

For each cyclide arc primitive, the four cyclide parameters a, b, c, d (as shown in FIGS. 8A and 8B) are computed using the parameters obtained in the algorithm from the following equations:

$$a = R$$

$$c = (r_2 - r_1)/(1 - \cos A)$$

$$b = \sqrt{a^2 - c^2}$$

$$d = r_1 + |c|$$

The position of the center of the cyclide is calculated to ensure it is continuous with the next primitive. Referred to FIGS. 6D(1), 6D(2), the center of the cyclide is displaced with respect to the center of the circular arc to compensate for the eccentricity of the director ellipse. The direction of the necessary displacement is up the y-axis in local cyclide coordinates, and its magnitude $\Delta r_0$ is computed by:

$$\Delta r_0 = a \sin A - b \cos A.$$

The equations above are derived under a coordinate transformation so that the start of the Dupin cyclide arc of FIG. 8B corresponds to u=0 (i.e. the origin corresponds to the arc centre, the initial point of the segment lies on the X axis, and the end point of the segment lies in the xy-plane). End Appendix 1

The embodiments of the present general inventive concept can be written as computer programs and can be implemented by digital computers that execute the programs using a computer readable recording medium. Also, a data structure used in the embodiments of the present general inventive concept may be recorded on the computer readable recording medium via any method. Examples of the computer readable recording medium include magnetic storage media (e.g., ROM, floppy disks, hard disks, etc.), optical recording media (e.g., CD-ROMs, or DVDs), etc.

Accordingly, it is to be understood that the embodiments of the present inventive concept herein described are merely illustrative of the application of the principles of the present inventive concept. Reference herein to details of the illustrated embodiments is not intended to limit the scope of the claims, which themselves recite those features regarded as essential to the present inventive concept.

The Following are Definitions of Terms Used Throughout the Specification:

Reducer: a program or device which takes an arbitrarily defined curve and reduces it to a minimal Polyline which will approximate the curve to a desired accuracy.

Polyline: a sparse set of contiguous points connected by line segments, per-point thickness information, and other data such as texture coordinates. This structure is either created directly by the user or is generated by Reducer.

Primitive: a geometric primitive described by a three-dimensional function, start/end range on said function, and a sweeping radius (thickness) at start and end of the said range. For example the function can be a cone frustum, a cylinder, or a canal surface like a torus, or a Dupin cyclide.

Primitive Generator: a program or device which converts Polylines into a set of Primitives.

Optimizer: a program or device which organizes generated Primitives into an optimization structure, such as a Bounding Volume Hierarchy.

Ray-tracer: a program or device which traces a set of rays to find their intersections with geometric objects and render an image of a scene containing said objects.

Primitive Processor: a program or device which determines if a Primitive intersects with a three-dimensional ray. The geometric equations of the Primitive, its start/end parameters, and radius/thickness at each end are used to perform these tests.

What is claimed is:

1. A method of generating geometric primitives from an arbitrary polyline having at least two consecutive line segments, comprising:
generating Dupin cyclide arcs between consecutive line segments of the polyline.

2. The method of claim 1, wherein if the Dupin cyclide arcs do not extend to the beginning point of the polyline, then further comprising:
generating a cone frustum on the polyline comprising a base point at a root of the polyline, a base having a radius equal to the radius at the root of the polyline, a height equal to half the length of the first line segment of the polyline, and a top radius linearly interpolated between the first point radius and the second point radius of the first line segment.

3. The method of claim 1, wherein if the Dupin cyclide arcs do not extend to the beginning point of the polyline, then further comprising:
generating cone frustum on the polyline comprising a base point at a middle of the last line segment of the polyline, a base having a radius interpolated using the first point radius and the second point radius of the last segment of the polyline.

4. The method of claim 1, wherein the Dupin cyclide arcs are generated by:
calculating a normal vector extending from each of the two consecutive line segments and using the intersection point of the vectors as a center point of a Dupin cyclide, a radius of the Dupin cyclide being the distance between the center point and a start point of one of the vectors;
setting a local coordinate system of the Dupin cyclide such that an XY plane is the plane defined by the two normal vectors, the origin being at the intersection of the two normal vectors;
choosing an orientation of the X axis;
setting a starting and ending angle of the Dupin cyclide arc so that the total arc angle is equal to the angle between the normal vectors;
calculating radii at the start point and the end point of the Dupin cyclide arc by interpolation at points where the normal vectors extend from respective line segments using radii at each end of the respective line segments; and
displacing the Dupin cyclide arc in the local XY plane until its end points lie on the polyline.

5. The method of claim 4, wherein if two consecutive line segments have equal lengths then midpoints of the line segments are calculated, and normal vectors extend from the respective midpoints.

6. The method of claim 4, wherein if one of consecutive line segments is longer than another, the normal vectors extend from the midpoint of the shorter line segment and a point on the longer segment such that the distance from the calculated point to the line segment's first end is equal to half the length of the shorter line segment.

7. The method of claim 6, wherein an additional cone frustum is generated and inserted between the calculated point and the next consecutively generated Dupin cyclide arc.

8. The method of claim 4, wherein:
if the primitive preceding the Dupin cyclide arc is a cone frustum, adjusting the cone's height with the length of the displacement component parallel to the first line segment; and
if the primitive preceding the Dupin cyclide arc is a Dupin cyclide arc, generating a cone frustum with a height equal to the length of the displacement component parallel to the first line segment and inserting the cone frustum between the two Dupin cyclide arcs;
if the primitive following the Dupin cyclide arc is a cone frustum, adjusting the cone's height with the length of the displacement component parallel to the second line segment; and
if the primitive preceding the Dupin cyclide arc is a Dupin cyclide arc, generating a cone frustum with a height equal to the length of the displacement component parallel to the second line segment and inserting the cone frustum between the two Dupin cyclide arcs.

9. A system to render a three-dimensional set of continuous consecutive geometric primitives from a polyline, the system comprising:
a primitive generator to generate a representation of a set of consecutive geometric primitives from a set of contiguous points connected by line segments of the polyline using per-point radius data and segment length data; and
a primitive processor to ray-trace the consecutive geometric primitives using start and end parameters and arbitrary radii at each end of the consecutive geometric primitives.

10. The system of claim 9, further comprising:
an optimizer to organize the consecutive geometric primitives into a bounding volume hierarchy structure prior to being ray-traced by the primitive processor.

11. The system of claim 9, wherein the primitive generator is configured to generate a Dupin cyclide arc between consecutive line segments of the polyline.

12. The system of claim 11, wherein the primitive generator generates the Dupin cyclide arcs by:
calculating a normal vector extending from each of two consecutive line segments and using the intersection point of the vectors as a center point of a Dupin cyclide, a radius of the Dupin cyclide arc being the distance between the center point and a start point of one of the vectors;
setting a local coordinate system of the Dupin cyclide such that an XY plane is the plane defined by the two normal vectors, the origin being at the intersection of the two normal vectors;
choosing an orientation of the X axis;
setting a starting and ending angle of the Dupin cyclide arc so that the total arc angle is equal to the angle between the normal vectors;
calculating radii at a start point and an end point of the Dupin cyclide arc by interpolation at points where the normal vectors extend from respective line segments using radii at each end of the respective line segments; and
displacing the Dupin cyclide arc in the local XY plane until its end points lie on the polyline.

13. The system of claim 11, wherein if the Dupin cyclide arcs do not extend to the beginning of the polyline, then the primitive generator further generates:
a cone frustum comprising a base point at a root of the polyline, a base having a radius equal to a radius at the root of the polyline, a height equal to half a length of a first segment of the polyline, and a top radius linearly interpolated between a first endpoint radius and a second endpoint radius of the first segment.

14. The system of claim 11, wherein if the Dupin cyclide arcs do not extend to the end of the polyline, then the primitive generator further generates:
a cone frustum comprising a base point at a midpoint between a first end and a second end of a last segment of the polyline, a base having a radius equal to a radius interpolated using the first endpoint radius and the second endpoint radius of the last segment and a top having a radius equal to the radius at the last line segment of the polyline.

15. The system of claim 9, wherein the primitive processor traverses each of a plurality of bounding boxes generated by the optimizer to find a set of bounding boxes which intersect with a ray acquired from a ray-tracing algorithm.

16. A method of producing a representation of an infinitely smooth curve from a set of geometric primitives, comprising:

generating rays to trace each of the geometric primitives;

determining whether the generated rays intersect respective surfaces of the geometric primitives; and determining, for the intersections that do occur, whether the intersections occur within an angle formed between two vectors that are used to generate a corresponding Dupin cyclide arc of each generated geometric primitive.

17. The method of claim 16, wherein the determining whether the generated rays intersect respective surfaces of the geometric primitives includes using variables of the geometric primitives aligned in a Cartesian coordinate graph.

18. The method of claim 16, further comprising:
organizing the set of geometric primitives into a bounding volume hierarchy structure prior to generating the rays.

* * * * *